United States Patent
Kodama

(10) Patent No.: US 8,195,113 B2
(45) Date of Patent: Jun. 5, 2012

(54) MOBILE STATION AND BASE STATIONS

(75) Inventor: Takeshi Kodama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 364 days.

(21) Appl. No.: 12/512,460

(22) Filed: Jul. 30, 2009

(65) Prior Publication Data

US 2010/0093398 A1    Apr. 15, 2010

(30) Foreign Application Priority Data

Oct. 15, 2008    (JP) .................................. 2008-266720

(51) Int. Cl.
*H01Q 11/12*    (2006.01)

(52) U.S. Cl. .................. 455/127.5; 455/574; 455/343.1; 455/13.4

(58) Field of Classification Search .................. 455/574, 455/343.1, 127.5, 572, 561, 13.4
See application file for complete search history.

(56) References Cited

U.S. PATENT DOCUMENTS

| | | | | |
|---|---|---|---|---|
| 6,845,238 | B1 * | 1/2005 | Muller | 455/436 |
| 7,561,539 | B2 * | 7/2009 | Sugaya | 370/278 |
| 7,620,390 | B2 * | 11/2009 | Vezza et al. | 455/414.1 |
| 7,965,651 | B2 * | 6/2011 | Du et al. | 370/252 |
| 2005/0124294 | A1 * | 6/2005 | Wentink | 455/41.2 |
| 2005/0197125 | A1 | 9/2005 | Kang et al. | |

FOREIGN PATENT DOCUMENTS

| | | |
|---|---|---|
| JP | 2007525128 | 8/2007 |
| WO | 2005086379 | 9/2005 |

\* cited by examiner

*Primary Examiner* — Kamran Afshar
*Assistant Examiner* — Marisol Fahnert
(74) *Attorney, Agent, or Firm* — Fujitsu Patent Center

(57) ABSTRACT

A mobile station includes an intermittent communication managing unit that manages a communication period for communicating with a first base station and a non-communication period for not communicating with the first base station, and a scan period setting unit that shifts and sets a scan period to reduce an overlap period with the communication period. The scan period, during which a scanning process for obtaining a condition of radio waves from a second base station can be executed, overlaps a plurality of the communication periods. Moreover, the mobile station includes a scan processor that executes the scanning process during the scan period.

10 Claims, 12 Drawing Sheets

| PARAMETER | CINR VALUE |
| --- | --- |
| EXECUTION CONDITION | SMALLER THAN THRESHOLD |
| THRESHOLD | 20 dB |

FIG.7

| BSID | CENTER FREQUENCY | BAND WIDTH |
|---|---|---|
| NBS#1 | 2503.5 MHz | 5 MHz |

FIG.8

| CID | LISTENING WINDOW LENGTH | SLEEPING WINDOW LENGH | PSC STATUS | INTRERMITTENT COMMUNICATION STARTING FRAME NUMBER |
|---|---|---|---|---|
| 1 | 15 FRAMES | 30 FRAMES | ACTIVATED | 10 |
| 2 | 10 FRAMES | 25 FRAMES | ACTIVATED | 15 |

FIG.9

| CID | TRAFFIC (FRAME) |
|---|---|
| 1 | 70 |
| 2 | 25 |

MOBILE STATION AND BASE STATIONS

CROSS-REFERENCE TO RELATED APPLICATION

This application is based upon and claims the benefit of priority of the prior Japanese Patent Application No. 2008-266720, filed on Oct. 15, 2008, the entire contents of which are incorporated herein by reference.

FIELD

The embodiments discussed herein are directed to a mobile station and base stations.

BACKGROUND

Some wireless communication systems use intermittent communication methods to reduce the power consumption of mobile stations. One example of the intermittent communication is illustrated in FIG. 17. In this example of intermittent communication, a mobile station (MS) communicates with a base station (BS) for a communication period of a predetermined length, while keeping in synchronization with the BS. During non-communication periods, the MS can save electric power by halting processors used for communication. Such an intermittent communication state may be referred to as a "sleep mode" (see, for example, International Publication Pamphlet No. WO 2005/086379).

In a cellular communication system, a scanning process is executed in order for the MS to be smoothly handed over from one cell to another. The scanning process is a measuring process for determining the next BS with which the MS will communicate and determining the quality of radio waves from a neighboring base station (NBS), which is located near a serving base station (SBS). The SBS is a base station with which the mobile station is currently communicating.

An example of the scanning process is illustrated in FIG. 18. The MS requests the SBS to provide a scan period when predetermined conditions are fulfilled, and the SBS returns a response. The scan period is defined as a duration for which the scanning process is executed. During the scan period, the MS synchronizes with a NBS, and after finishing scanning radio waves from the NBS, resumes synchronization with the SBS. Thus, during the scan period, a MS synchronizes with a NBS and does not have to communicate with the SBS.

A wireless communication system may have simultaneously two functions of intermittent communication and a scanning process. The problem with such system is that communication efficiency may be reduced. This problem is explained with reference to FIG. 19.

As depicted in FIG. 19, in a wireless communication system that has the two functions of intermittent communication and a scanning process, the scan period and the communication period during intermittent communication may overlap. The communication period during intermittent communication is a period in which a MS and a SBS communicate in order to send and receive user data like music data. However, when the communication period overlaps with the scan period, the duration of the overlap or overlap duration becomes a period during which the MS and the SBS cannot communicate. As a result, the opportunities to send and receive user data between the MS and the SBS become scarce, which leads to the decline in the communication efficiency.

SUMMARY

According to an aspect of the invention, a mobile station includes: an intermittent communication managing unit that manages a communication period for communicating with a first base station and a non-communication period for not communicating with the first base station; a scan period setting unit that shifts and sets a scan period to reduce an overlap period with the communication period, where the scan period, during which a scanning process for obtaining a condition of radio waves from a second base station can be executed, overlaps a plurality of the communication periods; and a scan processor that executes the scanning process during the scan period set by the scan period setting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of information on a NBS.

FIG. 8 illustrates an example of status information on an intermittent communication state.

FIG. 9 illustrates an example of a measurement result of communication traffic.

DESCRIPTION OF EMBODIMENTS

Preferred embodiments of the present invention will be explained with reference to the accompanying drawings. A wireless communication system compatible with the worldwide interoperability for microwave access (WiMAX) protocol is explained below as one example, although applications of the invention are not limited to such a wireless communication system. That is, the invention may be adopted for 3 G and 3.9 G cellular phone systems that have both intermittent-communication and scanning-process functions.

First Embodiment

Figure 1:
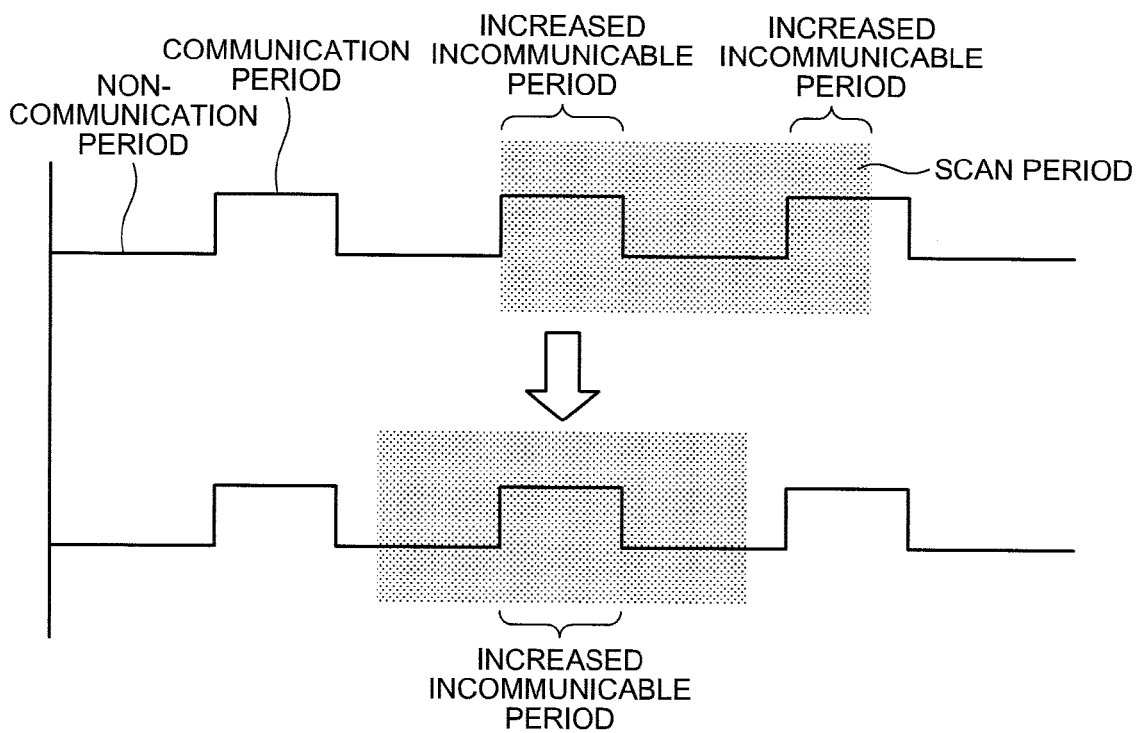
FIG. 1 illustrates a method of setting a scan period for an embodiment in accordance with the invention.

First, a method of setting a scan period of the embodiments of the invention is explained with reference to FIG. 1. As illustrated in FIG. 1, when the scan period overlaps a communication period during intermittent communication, the scan period setting method is used to shorten an overlap period (also called an "overlap duration") by adjusting a position of the scan period.

Specifically, the scan period setting method is used to adjust the scan period such that the onset of the scan period is in any of non-communication periods and the end of the scan period is in another non-communication period.

Adjusting the scan period in the above-described way can shorten incommunicable periods, which are periods that do not allow communication with a serving base station due to an overlap with a scan period despite a communication period. In the example of FIG. 1, the adjustment of the scan period removes the latter part of the incommunicable period, which appears when the scan period is not adjusted.

Figure 2:
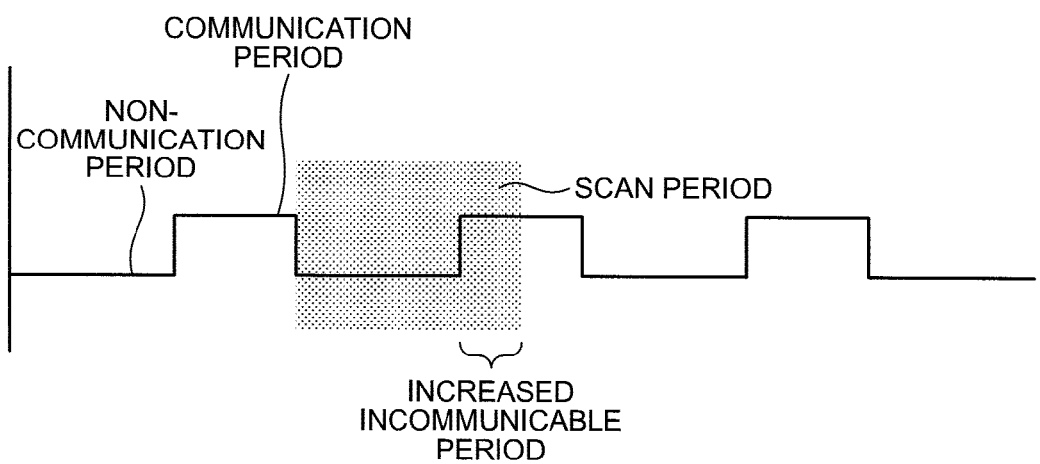
FIG. 2 illustrates an example where the onset of a scan period is adjusted to be identical to the onset of a non-communication period.
Figure 3:
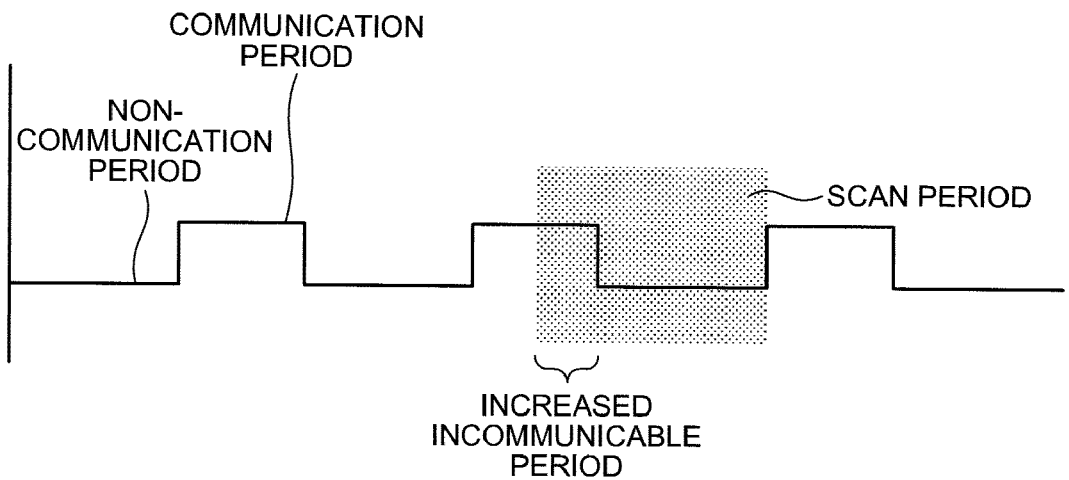
FIG. 3 illustrates an example where the end of a scan period is adjusted to be identical to the end of a non-communication period.

When the scan period cannot be adjusted in the above-described way, the scan period setting method of the embodiments is used to either conform an onset of the scan period to the onset of a non-communication period, as illustrated in FIG. 2, or conform an end of the scan period to the end of the non-communication period, as illustrated in FIG. 3. This adjustment can increase the overlapped period during which the scan period overlaps with the non-communication period, relatively shortening the incommunicable period.

In a case where the length of the non-communication period varies, for example, there is a difference in the length of an overlapped period between the scan period and the communication period, when comparing a case where an onset of the scan period is conformed to the onset of the non-communication period with another case where an end of the scan period is conformed to the end of the non-communication period. Under these circumstances, the scan period is adjusted to be in a position that makes shorter the overlapped period between the scan period and the communication period.

Figure 4:
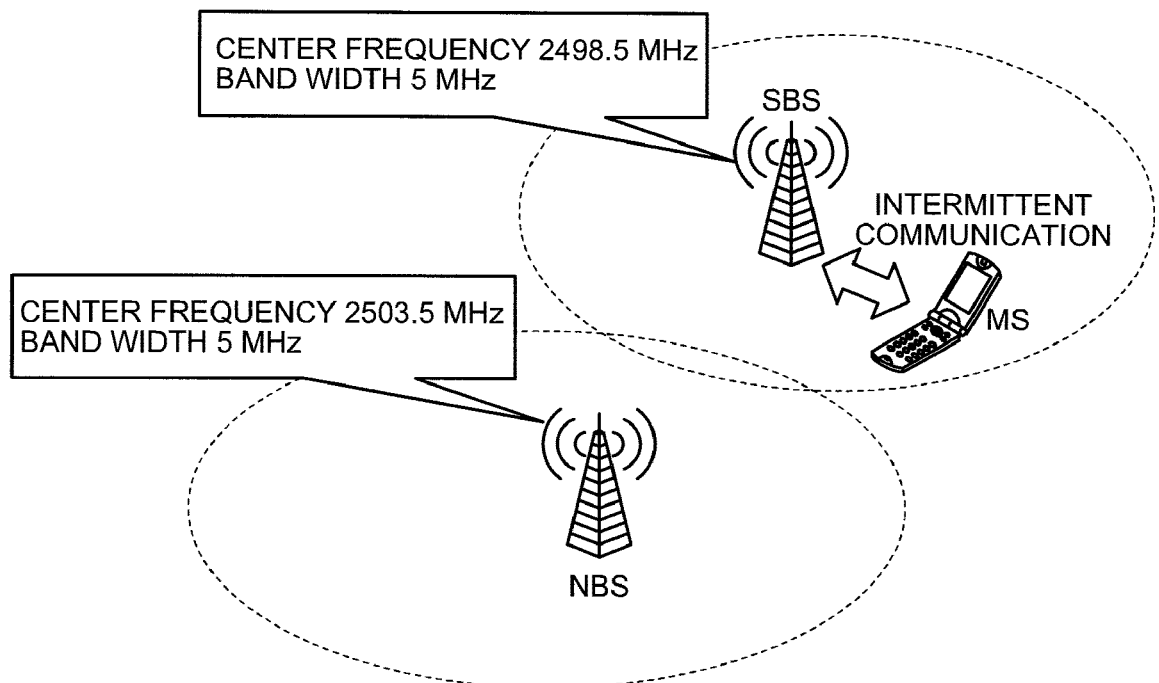
FIG. 4 illustrates one example of a network structure.

Next, a structure of a mobile station (MS) 10, which executes the scan period setting method described above, is explained below. A network structure that includes the MS 10 is the one illustrated in FIG. 4. The specifications of a serving base station (SBS) and a neighbor base station (NBS) are as follows:

[SBS] Center frequency: 2498.5 MHz; Band width: 5 MHz.

[NBS] Center frequency: 2503.5 MHz; Band width: 5 MHz.

Figures 5, 6:
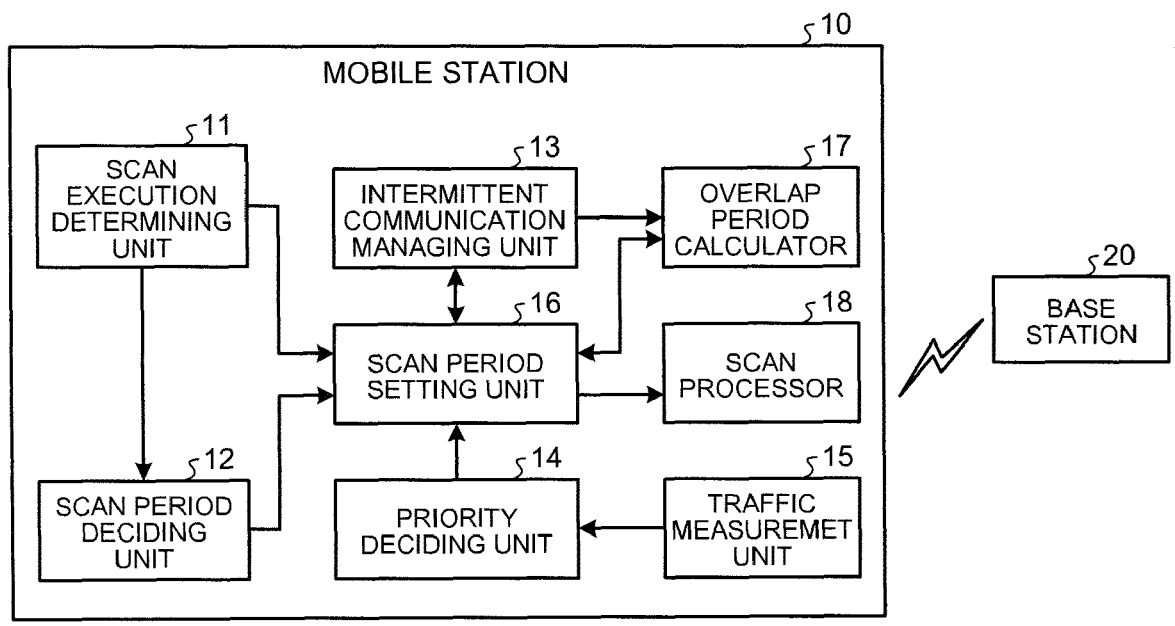
FIG. 5 is a block diagram representing a structure of a MS in accordance with of a first embodiment of the invention.
FIG. 6 illustrates an example of a condition for executing a scanning process.

FIG. 5 is a block diagram illustrating a structure of the MS 10. As depicted in FIG. 5, the MS 10 is a device for wireless or radio communication with a base station (BS) 20, and includes a scan execution determining unit 11, a scan period deciding unit 12, an intermittent communication managing unit 13, a priority deciding unit 14, a traffic measurement unit 15, a scan period setting unit 16, an overlap period calculator 17, and a scan processor 18. FIG. 5 omits units other than the units that are related to the functions of intermittent communication and scanning process.

The scan execution determining unit 11 determines, based on a predetermined execution condition, if an execution of a scanning process is necessary. An example of an execution condition for the scanning process is illustrated in FIG. 6. The execution condition in FIG. 6 shows that the scan execution determining unit 11 monitors a received signal strength indicator (RSSI) the MS 10 receives from the NBS, and determines to execute a scanning process when the carrier to interference-plus-noise ratio (CINR) becomes smaller than a threshold of 20 dB.

The scan period deciding unit 12 decides the length of a scan period.

The length of the scan period may be decided using any format, and for example, may be decided in accordance with the number of NBSs such as 40 frames for each NBS. The MS 10 obtains the information about the NBSs from a message MOB_NBR-ADV periodically sent from the SBS, and retains the information as illustrated in FIG. 7. The scan period deciding unit 12 can obtain the number of the NBSs from this information.

The intermittent communication managing unit 13 manages the status of intermittent communication. Specifically, the intermittent communication managing unit 13 acquires the information on the length of a Listening Window (Listening Window length) (communication period) and the length of a Sleeping Window (Sleeping Window length) (non-communication period) from a power saving class (PSC) to retain the information as intermittent communication status information.

An example of intermittent communication status information is illustrated in FIG. 8. As illustrated in FIG. 8, the intermittent communication status information includes items such as a connection ID (CID), Listening Window Length, Sleeping Window Length, PSC status, and the frame number for starting intermittent communication (intermittent communication starting frame number). The information is stored for each connection that constitutes a communication connection with the SBS.

The CID is an identification number for identifying a connection.

The Listening Window Length is a length of a communication period during intermittent communication, while the Sleeping Window Length is a length of a non-communication period during intermittent communication. The PSC status indicates if the connection is in a mode of intermittent communication, taking a value of either "activated" or "deactivated". The PSC status value "activated" means that the corresponding connection is in a state for performing intermittent communication, while the PSC status value "deactivated" means that the corresponding connection is not in a state for performing intermittent communication. The intermittent communication starting frame number is the number of a frame at which intermittent communication has started.

In this way, the MS 10 has the ability to switch between whether or not intermittent communication is performed for each connection, and to independently set the timing of the communication period and the non-connection period for each connection.

The priority deciding unit 14 decides the priority of each connection. A priority decision may be made using any form. In the embodiment, based on the traffic for each connection measured by the traffic measurement unit 15, a connection with higher traffic is assumed to have a higher priority. Incidentally, determining priority may be based on, for example, the quality of service (QoS) set for each connection.

The traffic measurement unit 15 measures the traffic of each connection. An example of measurement results of traffic by the traffic measurement unit 15 is illustrated in FIG. 9. The example in FIG. 9 illustrates the traffic measured for each connection by the frame.

The scan period setting unit 16 determines the start timing of a scan period with a length determined by the scan period deciding unit 12, when the scan execution determining unit 11 determines that an execution of the scanning process is necessary.

Specifically, the scan period setting unit 16 inquires of the intermittent communication managing unit 13 if there is a connection that is in a state of establishing intermittent communication. If there is not, communication efficiency is identical with respect to the start timing of the scan period. Therefore, in this situation, the scan period setting unit 16 determines a certain time after a lapse of a predetermined time as the start timing of the scan period.

On the other hand, if there is a connection that is in a state of establishing intermittent connection, the scan period setting unit 16 acquires the communication period and the non-communication period of each connection from the intermittent communication managing unit 13 to obtain a common non-communication period by calculating their logical sum. The logical sum, if at least one connection is in a communication period, means a process that regards the period as a communication period. The common non-communication period means a period when no connection is in a communication period.

Figure 10:
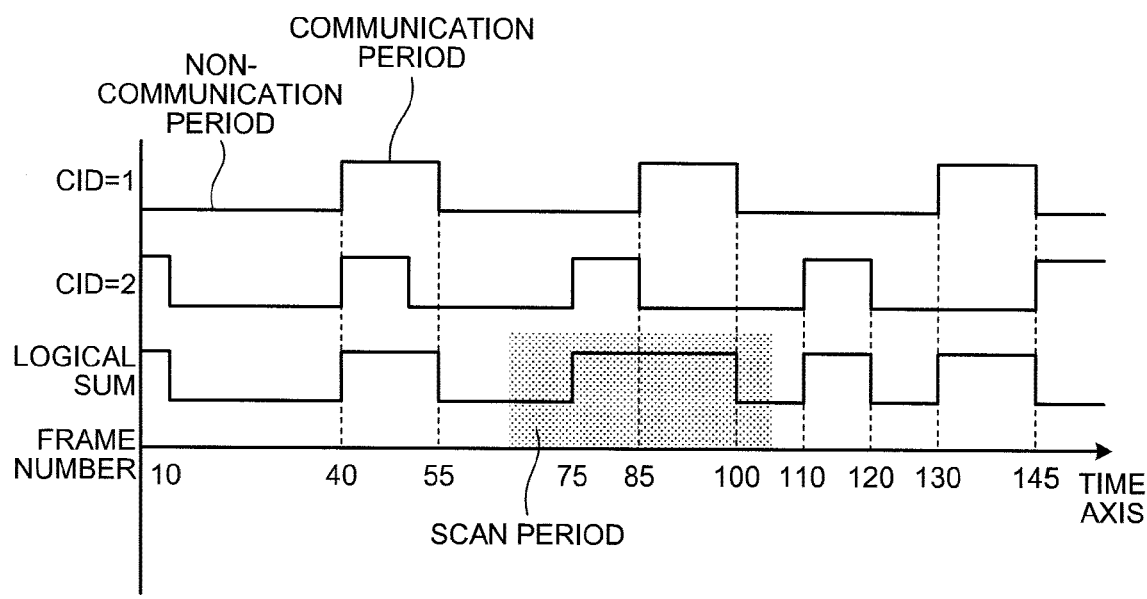
FIG. 10 illustrates an example of a set scan period.

Next, the scan period setting unit 16, as illustrated in FIG. 10, confirms that the start timing of the scan period can be set, so that an onset of the scan period is included in any of common non-communication periods and the end of the scan period is included in another non-communication period. If a start timing of the scan period can be successfully set, the start timing is determined to be the start timing of the scan period. The reasons are that the overlap period of the common non-communication period and the scan period can be maximized, and that a period during which each connection cannot communicate with the SBS can be relatively shortened owing to an overlap of the scan period and the communication period.

When the above-described timing can not be set, the scan period setting unit 16 makes the overlap period calculator 17 calculate an overlap period of the scan period and the communication period of each connection, where an onset of the scan period is adjusted to coincide with the onset of the common non-communication period. Then, the scan period setting unit 16 performs a summation, weighting the overlap periods calculated for each connection so that an overlap period of a connection determined to have higher priority by the priority deciding unit 14 is evaluated as being longer.

Further, the scan period setting unit 16 causes the overlap duration calculator 17 to calculate an overlap duration of the scan period and the communication period, where an end of the scan period is adjusted to coincide with an end of the common non-communication period. Then, the scan period setting unit 16 performs a summation, weighting the overlap periods calculated for each connection so that an overlap period of a connection determined to have higher priority by the priority deciding unit 14 is evaluated as being longer.

The scan period setting unit 16 uses a scan period that gives a smaller sum for the overlap duration. The reason is that since the overlap duration, during which the communication with the SBS is supposed to be established from the viewpoint of intermittent communication, is actually a duration in which the overlap with the scan period does not allow the communication with the SBS, a shorter overlap duration is preferable for improving communication efficiency.

The reason for weighting in accordance with the priority is to give preference to improving communication efficiency of connections that have higher priority. Thus, the degree of weighting depends on the degree of preference given to the communication efficiency of higher priority connections.

Figure 11:
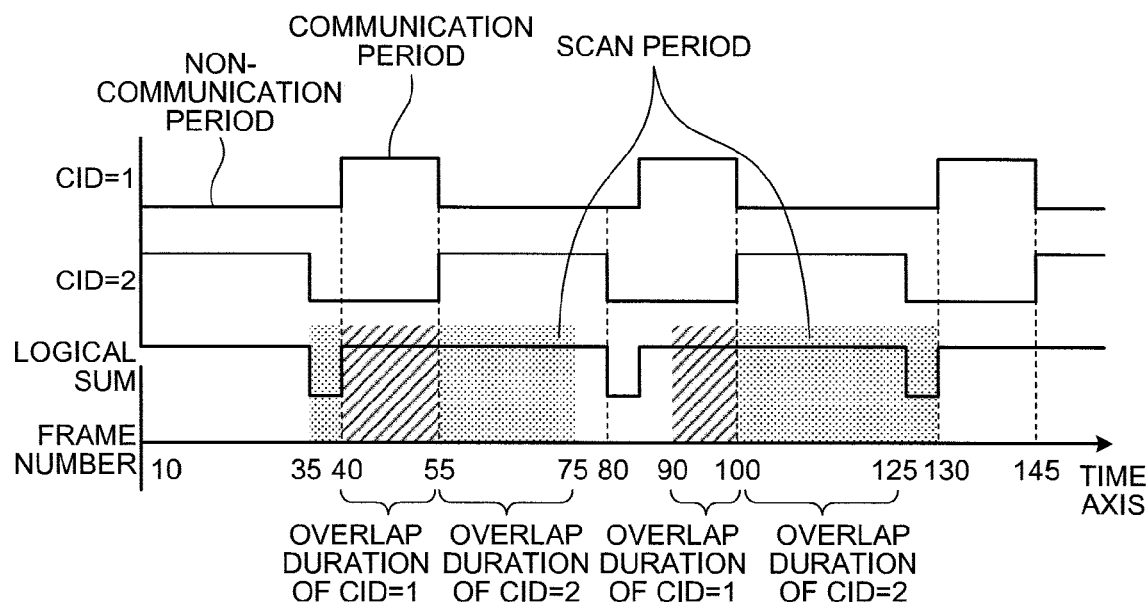
FIG. 11 illustrates an example of a comparison of overlap durations.

FIG. 11 depicts an example of a comparison of overlap durations. As illustrated in FIG. 11, when the start timing of the scan period is set to the position of frame number 35 so as to conform an onset of the scan period to an onset of the common non-communication period, the overlap durations for each connection are as follows:

15 frames where CID=1
20 frames where CID=2

Also in the example of FIG. 11, when the start timing of the scan period is set to a position of frame number 90 so that the end of the scan period coincide with is the end of the common non-communication period, the overlap durations for each connection are as follows:

10 frames where CID=1
25 frames where CID=2

Assuming that the priority of the connection with CID=1 is the highest and that the overlap duration with the highest priority connection has a weighting that is double, the sum total for the overlap durations is as follows:

In a case where the start timing belongs to frame number 35, the sum total is 50.

In a case where the start timing belongs to frame number 90, the sum total is 45.

In this example, when the start timing of the scan period is set at the position of the frame number 90, the sum total of the overlap duration is smaller. Therefore, the scan period setting unit 16 determines the start timing for the scan period to be at the position of the frame number 90.

Returning to explaining FIG. 5, the overlap period calculator 17 calculates the overlap period of the communication period and the scan period for each connection. The scan processor 18 executes scanning process during the scan period, by interacting with the SBS in order to start the scan period based on a timing determined by the scan period setting unit 16. The adjustment of the scan period through the interaction with the SBS may be realized by exchanging MOB_SCN-REQ and MOB_SCN-RSP.

Figure 12:
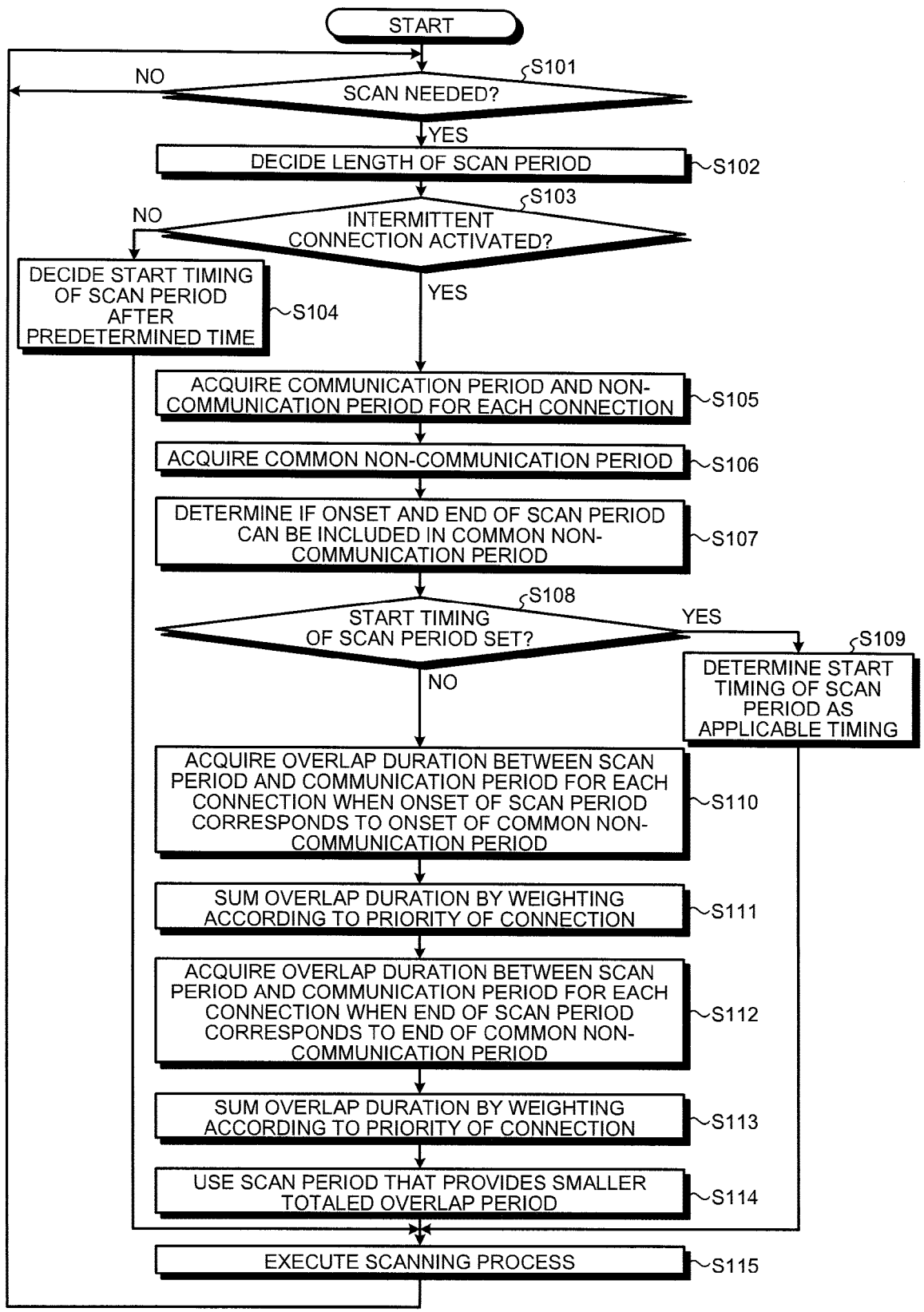
FIG. 12 is a flowchart representing a procedure for setting a scan period executed by an MS in accordance with the first embodiment of the invention.

Next, a procedure for the scan period setting processing of the MS 10 is explained. FIG. 12 is an exemplary flowchart illustrating the procedure for the scan period setting process. As illustrated in FIG. 12, the scan execution determining unit 11 determines if an execution of scanning process is necessary (S101), and in determining that the execution is unnecessary (S101, No), re-executes the determination (S101).

When the scan execution determining unit 11 determines that the execution is necessary (S101, Yes), the scan period deciding unit 12 decides the length of the scan period (S102). Then, the scan period setting unit 16 inquires of the intermittent communication managing unit 13 if there is a connection that is performing intermittent communication. If there is not (S103, No), the scan period setting unit 16 determines a time after the lapse of a predetermined time as a start timing of the scan period (S104). The scan processor 18 executes the scanning process with the start timing (S115), and then the procedure restarts from the step S101.

If, in contrast, there is a connection that is performing intermittent communication (S103, Yes), the scan period setting unit 16 acquires the communication period and the non-communication period of each connection from the intermittent communication managing unit 13 (S105). Then, their logical sum is calculated to obtain the common non-communication period (S106). Next, the scan period setting unit 16 determines if the start timing of the scan period can be set so that the onset of the scan period is included in any of the common non-communication period and the end of the scan period is included in any of the common non-communication period (S107).

If the start timing can be set (S108, Yes), the scan period setting unit 16 determines the start timing of the case as the start timing of the scan period (S109). Then, the scan processor 18 executes the scanning process with the start timing (S115), and the procedure restarts from S101.

When the start timing can not be set (S108, No), the scan period setting unit 16 allows the overlap period calculator 17 to calculate the overlap duration of the scan period and the communication period for each connection, in a case where the onset of the scan period is conformed to the onset of the common non-communication period (S110). Then, the scan period setting unit 16 sums up the overlap durations calculated for each connection by applying a weighting according to the priority (S111).

Further, the scan period setting unit 16 causes the overlap period calculator 17 to calculate the overlap duration of the scan period and the communication period for each connection, in which an end of the scan period corresponds to an end of the common non-communication period (S112). Then, the scan period setting unit 16 totals, by weighting in accordance with the priority (S113), the overlap durations calculated for each connection.

The scan period setting unit 16 uses a scan period that gives a smaller total of the overlap durations (S114). The scan processor 18 executes the scanning process with a start timing used (S115), and then the procedure restarts from S101.

Second Embodiment

In the first embodiment, an example of weighting overlap durations according to priority is explained in order to reflect the priority of each connection to the setting of the scan period. The second embodiment presents, in another way, an example of reflecting the priority of each connection to the setting of the scan period.

To begin with, a structure of a MS 30 in accordance with this embodiment will be explained. The same reference numerals and appellations assigned to the elements in the first embodiment that are already explained can be applied to the same elements in the second embodiment. The explanation of the elements that is already made is not made.

Figure 13:
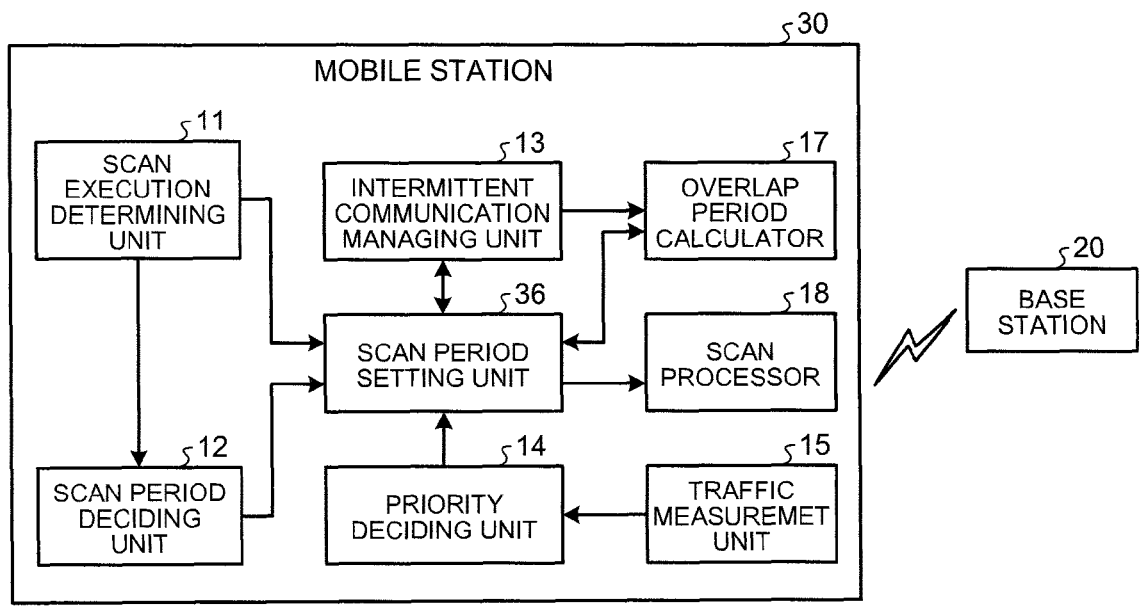
FIG. 13 is a block diagram representing a structure of a MS in accordance with of a second embodiment of the invention.

FIG. 13 is a block diagram illustrating a structure of the MS 30. As depicted in FIG. 13, the MS 30 is a communication device for wireless or radio communication with the BS 20 and includes a scan execution determining unit 11, a scan period deciding unit 12, an intermittent communication managing unit 13, a priority deciding unit 14, a traffic measurement unit 15, a scan period setting unit 36, an overlap period calculator 17, and a scan processor 18. FIG. 13 omits elements other than the elements related to the functions for intermittent communication and a scanning process.

The scan period setting unit 36 determines a start timing of the scan period with a length determined by the scan period deciding unit 12, when executing the scanning process is determined to be necessary by the scan execution unit 11.

Specifically, the scan period setting unit 36 inquires of the intermittent communication managing unit 13 if there is a connection that is ready for establishing intermittent communication. If there is not, the scan period setting unit 36 determines a time after the lapse of a predetermined time as a start timing of the scan period.

On the other hand, if there is, the scan period setting unit 36 acquires the communication period and non-communication period for each connection from the intermittent communication managing unit 13 to obtain a common non-communication period by calculating their logical sum.

Next, the scan period setting unit 36, as illustrated in FIG. 10, confirms if the start timing of the scan period can be set so that the onset of the scan period is included in any of the common non-communication period and the end of the scan period is included in another common non-communication period. If the start timing can be set, the start timing set is determined to be the start timing of the scan period.

If the above-mentioned timing can not be set, the scan period setting unit 36 re-acquires the common non-communication period, excluding a connection with the lowest priority decided by the priority deciding unit 14, Next, the scan period setting unit 36 confirms if the start timing of the scan period can be set, so that the onset of the scan period is included in any of the common non-communication period and the end of the scan period is included in another common non-communication period. If the start timing can be set, the start timing set is determined to be the start timing of the scan period.

Figure 14:
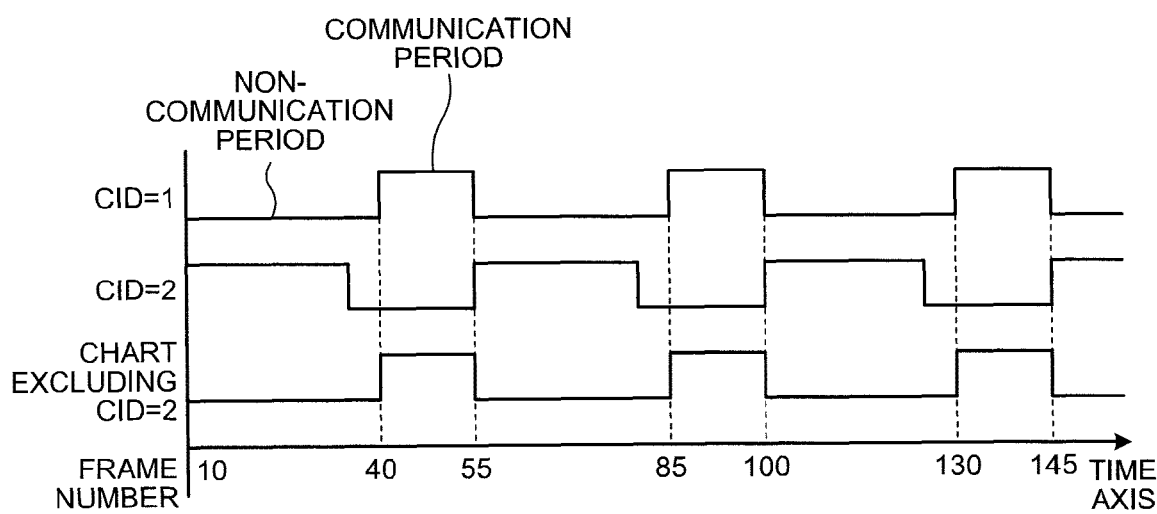
FIG. 14 illustrates an example of excluding a connection.

For example, in the example illustrated in FIG. 10, if the above-mentioned timing can not be set, the scan period setting unit 36, excluding the connections of lower priority, re-acquires the common non-communication period. In this example, if a connection of CID=2 is assumed to have lower priority, the connection is excluded and the common non-communication period is reset as illustrated in FIG. 14. The common non-communication period after the reset has become longer than before the reset, which enables the above-mentioned timing to be easily set.

In this way, communication efficiency for connections with higher priority can be improved, by excluding connections with lower priority one by one and searching the start timing that gives an optimum scan period.

Figure 15:
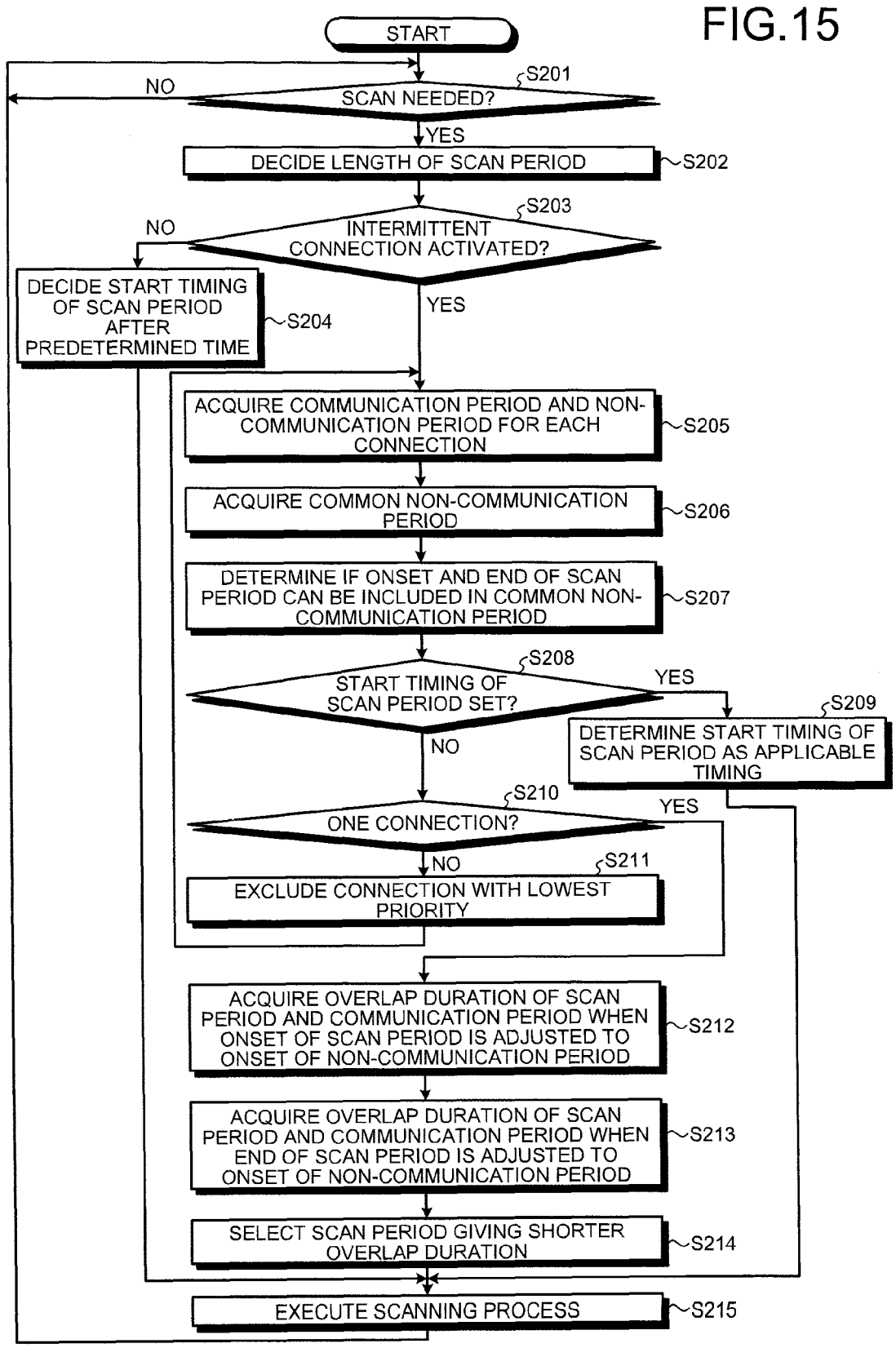
FIG. 15 is a flowchart representing a procedure for setting a scan period executed by the MS in accordance with the second embodiment of the invention.

Next, the steps of a scan period setting process by the MS 30 are explained. FIG. 15 is a flowchart representing the steps of the scan period setting process. As illustrated in FIG. 15, the scan execution determining unit 11 determines if executing the scanning process is necessary (S201), and in determining that the execution is unnecessary (S201, No), re-executes the determination (S201).

When the scan execution determining unit 11 determines that the execution is necessary (S201, Yes), the scan period deciding unit 12 decides the length of the scan period (S202). Then, the scan period setting unit 36 inquires of the intermittent communication managing unit 13 if there is a connection that is performing intermittent communication. If there is not (S203, No), the scan period setting unit 36 determines a time after the lapse of a predetermined time as the start timing of the scan period (S204). The scan processor 18 executes the scanning process with the start timing (S215), and then the procedure restarts from the step S201.

If, in contrast, there is a connection that is performing intermittent communication (S203, Yes), the scan period setting unit 36 acquires the communication period and the non-communication period for each connection from the intermittent communication managing unit 13 (S205). Then, their logical sum is calculated to obtain the common non-communication period (S206). Next, the scan period setting unit 36 determines if the start timing of the scan period can be set so that the onset of the scan period is included in any of the common non-communication period and the end of the scan period is included in another common non-communication period (S207).

If the start timing can be set (S208, Yes), the scan period setting unit 36 determines the start timing of the case as the start timing of the scan period (S209). Then, the scan processor 18 executes the scanning process with the start timing (S215), and the procedure restarts from S201.

When, on the other hand, the start timing can not be set (S208, No), the scan period setting unit 36 confirms if there is only one connection that has not been excluded from acquiring the common non-communication period (S210). If there is not only one connection (S210, No), the scan period setting unit 36 excludes from acquiring the common non-communication period a connection with the lowest priority from among the connections that have not been excluded from acquiring the common non-communication period (S211). Then, the procedure restarts from step S205.

On the other hand, When there is only one connection that has not been excluded from acquiring the common non-communication period in step S210 (S210, Yes), the scan period setting unit 36 allows the overlap duration calculator 17 to calculates an overlap duration of the scan period and the communication period for each connection where the onset of the scan period is adjusted to the onset of the non-communication period (S212).

Further, the scan period setting unit 36 makes the overlap duration calculator 17 calculate an overlap duration of the scan period and the communication period for each connection when the end of the scan period is adjusted to coincide with the end of the common non-communication period (S213).

The scan period setting unit 36 selects a scan period that gives a shorter overlap duration (S214). The scan processor 18 executes the scanning process with the start timing selected (S215). Then the procedure restarts from step S201.

Third Embodiment

The scan period is set by the MS in the first and second embodiments, but may set by the BS. Accordingly, a third embodiment explains an example of setting the scan period by the BS.

Figure 16:
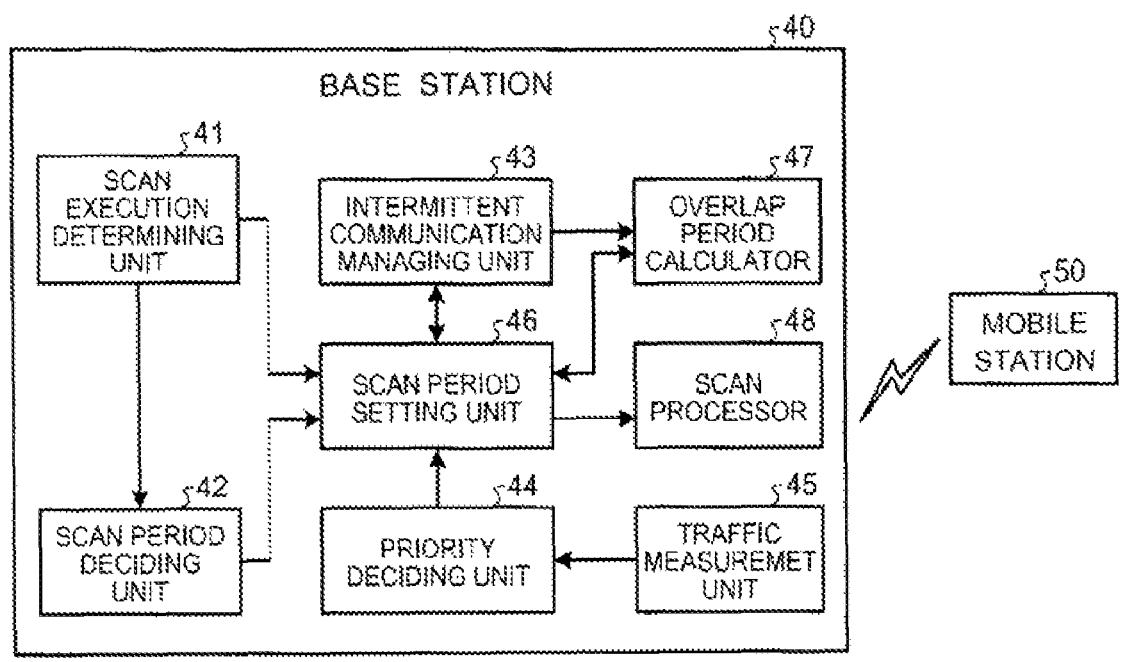
FIG. 16 is a block diagram representing a structure of a BS in accordance with of a third embodiment of the invention.
Figure 17:
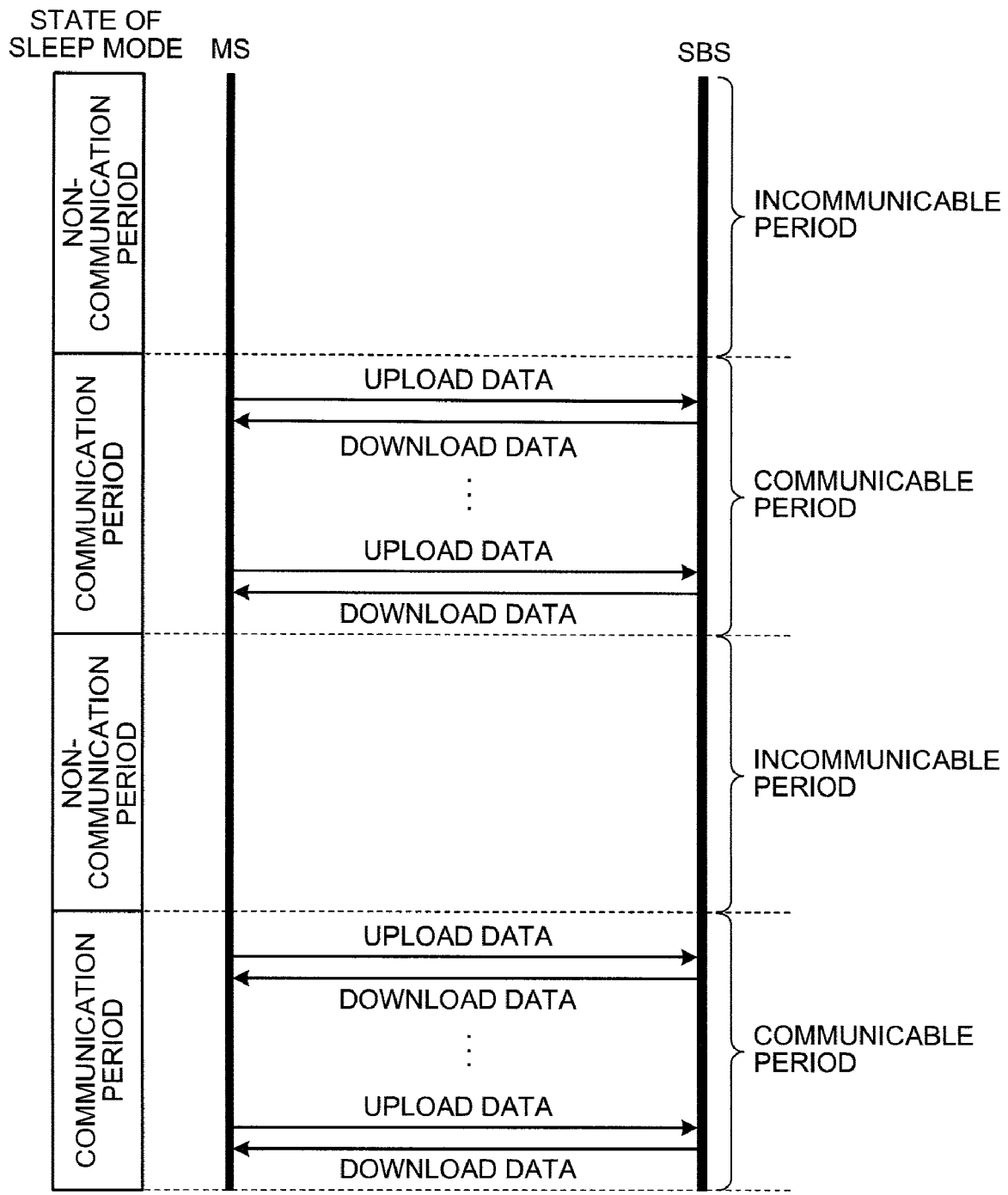
FIG. 17 illustrates intermittent communication.
Figure 18:
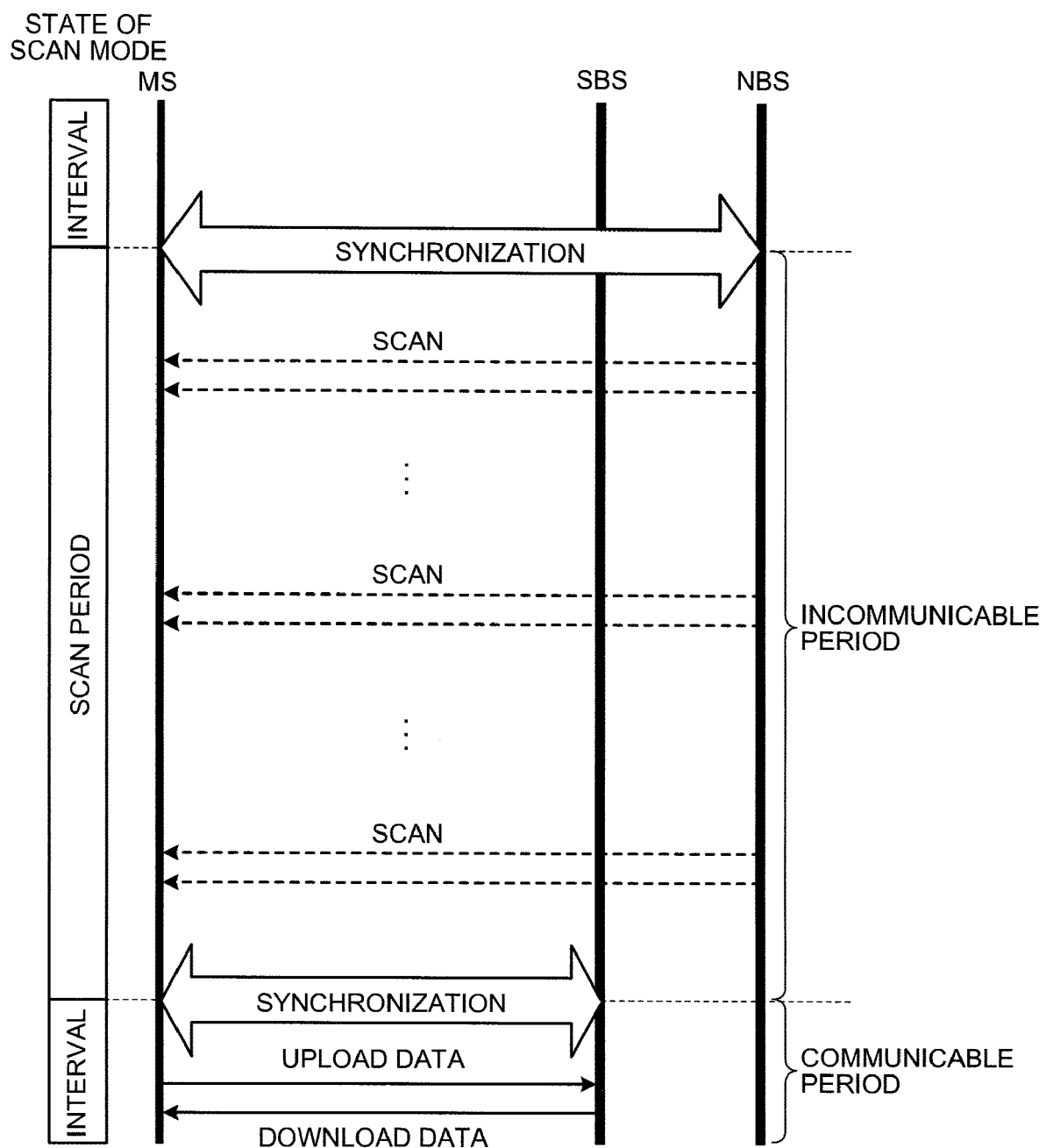
FIG. 18 illustrates a scan period.
Figure 19:
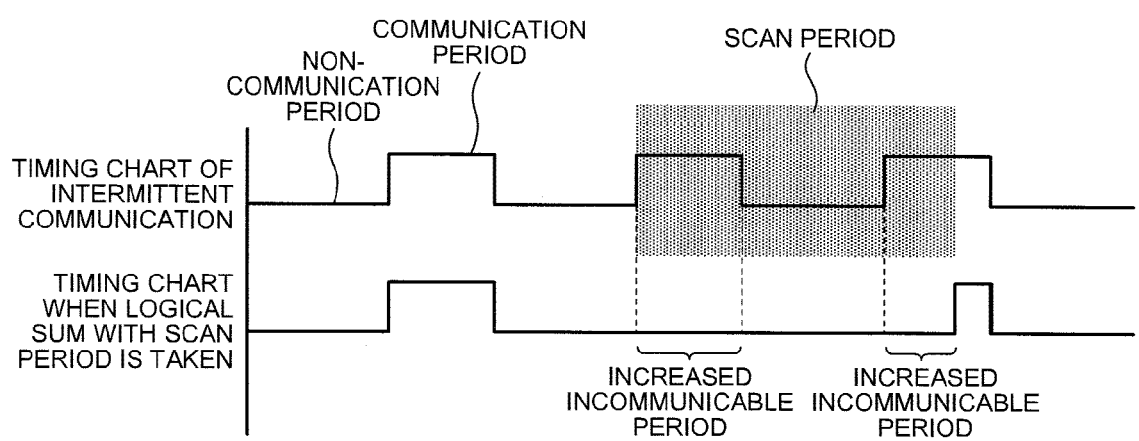
FIG. 19 illustrates an example where the scan period overlaps a non-communication period.

First, a structure of a BS 40 in accordance with this embodiment is explained. FIG. 16 is a block diagram of the structure of the BS 40. As depicted in FIG. 16, the BS 40 is a communication device for wireless communication with a MS 50, and includes a scan execution determining unit 41, a scan period deciding unit 42, an intermittent communication managing unit 43, a priority deciding unit 44, a traffic measurement unit 45, a scan period setting unit 46, an overlap period calculator 47, and a scan processor 48. FIG. 16 illustrates only elements related to the functions of intermittent communication and a scanning process, while other elements are omitted.

The scan execution determining unit 41, based on a predetermined condition, determines whether or not executing the scanning process is necessary for each MS 50 that is in communication with the BS 40. For example, the scan execution determining unit 41 determines if executing the scanning process is necessary based on the CINR informed by the MS 50 in communication.

The scan period deciding unit 42 decides the length of the scan period for each of the MS 50 that is communicating with the BS 40. The decision of the length of the scan period may be made using any method. For example, the length may be decided, depending on the number of NBSs for the MS 50 such as 40 frames for each neighbor station.

The intermittent communication managing unit 43 manages the states of intermittent communication for each MS 50 that is communicating with the BS 40. Specifically, the intermittent communication managing unit 43 obtains information such as the length of listening window and length of sleeping window from a PSC to keep the information as intermittent communication state information.

The priority deciding unit 44 determines the priority for each connection with respect to each MS 50 that is communicating with the BS 40. The decision of the priority may be made using any method. In this embodiment, based on the communication traffic for each connection measured by the traffic measurement unit 45, a connection with higher traffic is regarded to have higher priority. Moreover, the decision of priority may be based on, for example, the quality of service (QoS) set for each connection.

The scan period setting unit 46 determines the start timing for the scan period having a length determined by the scan period deciding unit 42, with regard to the MS 50 that is determined by the scan execution unit 41 that executing the scanning process is necessary.

Specifically, the scan period setting unit 46 inquires of the intermittent communication managing unit 43 whether or not there is a connection that is ready to establish intermittent communication with the mobile terminal 50 for which executing the scanning process is determined to be necessary. If there is not, the scan period setting unit 46 determines a time after a predetermined duration as the start timing of the scan period.

Meanwhile, if there is, the scan period setting unit 46 acquires, from the intermittent communication managing unit 43, the communication period and the non-communication period for each connection of the MS 50 that has been determined that executing the scanning process is necessary. Then, the common non-communication period is acquired by obtaining their logical sum.

The scan period setting unit 46, as illustrated in FIG. 10, confirms if the start timing of the scan period can be set so that the onset of the scan period is included in any common non-communication period, and the end of the scan period is included in another common non-communication period. If the start timing can be set, the start timing in this case is determined to be a start timing of the scan period.

If the start timing can not be set, the scan period setting unit 46 causes the overlap period calculator 47 to calculate an overlap period of the scan period and the communication period for each connection, where the onset of the scan period is adjusted to coincide with the onset of the common non-communication period. The overlap period may be calculated for each connection of the MS 50 for which executing the scanning process has been determined to be necessary. Then, the scan period setting unit 46 performs a summation by weighting the calculated overlap period for each connection so that an overlap period for a connection having higher priority, which is determined by the priority deciding unit 44, is evaluated as being longer.

Further, the scan period setting unit 46 gets the overlap period calculator 47 to calculate an overlap period of the scan period and the communication period for each connection, where the end of the scan period coincides with the end of the common non-communication period. The overlap period may be calculated for each connection of the MS 50 for which executing the scanning process has been determined to be necessary. Then, the scan period setting unit 46 performs a summation by weighting the calculated overlap period for each connection so that an overlap period for a connection having higher priority, which is determined by the priority deciding unit 44, is evaluated as being longer.

The scan period setting unit 46 uses the scan period that produces a smaller sum value of the overlap period.

If the start timing of the scan period cannot be set so that the onset of the scan period is included in any of the common non-communication period and the end of the scan period is included in another common non-communication period, the scan period may be set in the same way described in the second embodiment. That is, the start timing that meets the above conditions may be sought by excluding connections in order of increasing priority starting with a connection with lower priority and resetting the common non-communication period.

The overlap duration calculator 47 calculates, for each connection, the length of the overlap duration of the scan period and the communication period. The scan processor 48 interacts with the MS 50 for initiating the scan period at the timing determined by the scan period setting unit 46. The interaction with the MS 50 for adjusting the scan period can be realized, for example, by exchanging MOB_SCN-REQ and MOB_SCN-RSP.

According to the embodiments of the invention, the MS and BS having excellent communication efficiency can be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mobile station comprising:
   an intermittent communication managing unit that manages a communication period for communicating with a first base station and a non-communication period for not communicating with the first base station;
   a scan period setting unit that shifts and sets a scan period to reduce an overlap period with the communication period, where the scan period, during which a scanning process for obtaining a condition of radio waves from a second base station can be executed, overlaps the communication period; and
   a scan processor that executes the scanning process during the scan period set by the scan period setting unit, wherein,
   when a plurality of connections has been established with regard to the first base station, the scan period setting unit sets the scan period so that as priority of the connection becomes higher, the overlap period of the scan period and the communication period becomes shorter.

2. The mobile station according to claim 1, wherein the scan period setting unit sets the scan period so that an onset of the scan period and an end of the scan period are included in the non-communication period.

3. The mobile station according to claim 1, wherein the scan period setting unit sets the onset of the scan period to be identical to an onset of the non-communication period.

4. The mobile station according to claim 1, wherein the scan period setting unit sets the end of the scan period to be identical to an end of the non-communication period.

5. The mobile station according to claim 1, further comprising:
   an overlap period calculator that calculates the overlap period of the scan period and the communication period; and
   wherein the scan period setting unit selects a scan period that gives a shorter time length of the overlap period calculated by the overlap period calculation unit, out of the scan period whose onset is set to be identical to the onset of the non-communication period and the scan period whose end is set to be identical to the end of the non-communication period.

6. A base station comprising:
   an intermittent communication managing unit that manages a communication period for communicating with a mobile station and a non-communication period for not communicating with the mobile station;
   a scan period setting unit that shifts and sets a scan period to reduce an overlap period with the communication period, where the scan period, during which a scanning process for obtaining a condition of radio waves from another base station received by the mobile station can be executed, overlaps the communication period; and
   a scan processor that causes the mobile station to execute the scanning process during the scan period set by the scan period setting unit, wherein,
   when a plurality of connections has been established with regard to the mobile station, the scan period setting unit sets the scan period so that as priority of the connection becomes higher, the overlap period of the scan period and the communication period becomes shorter.

7. The base station according to claim 6, wherein the scan period setting unit sets the scan period so that an onset of the scan period and an end of the scan period are included in the non-communication period.

8. The base station according to claim 6, wherein the scan period setting unit sets the onset of the scan period to be identical to an onset of the non-communication period.

9. The base station according to claim 6, wherein the scan period setting unit sets the end of the scan period to be identical to an end of the non-communication period.

10. The base station according to claim 6 further comprising:
    an overlap period calculator that calculates the overlap period of the scan period and the communication period; and
    wherein the scan period setting unit selects a scan period that gives a shorter time length of the overlap period calculated by the overlap period calculation unit, out of the scan period whose onset is set to be identical to the onset of the non-communication period and the scan period whose end is set to be identical to the end of the non-communication period.

* * * * *